(12) United States Patent
Liu et al.

(10) Patent No.: US 8,983,126 B2
(45) Date of Patent: Mar. 17, 2015

(54) METHOD AND SYSTEM FOR DETECTING VEHICLE POSITION BY EMPLOYING POLARIZATION IMAGE

(75) Inventors: Tong Liu, Beijing (CN); Zhongchao Shi, Beijing (CN); Cheng Zhong, Beijing (CN); Yuan Liu, Beijing (CN); Yi Chen, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 284 days.

(21) Appl. No.: 13/589,393

(22) Filed: Aug. 20, 2012

(65) Prior Publication Data

US 2013/0058528 A1 Mar. 7, 2013

(30) Foreign Application Priority Data

Sep. 7, 2011 (CN) .......................... 2011 1 0263794

(51) Int. Cl.
*G06K 9/00* (2006.01)
(52) U.S. Cl.
CPC ........ *G06K 9/00805* (2013.01); *G06K 9/00798* (2013.01)
USPC .......................................... 382/103; 382/104

(58) Field of Classification Search
CPC .......... G06K 9/00791; G06K 9/00798; G06K 9/00805; G06K 9/00785; G06K 9/2036; G08G 1/16; G08G 1/167; G08G 1/04; G06T 7/0042; G06T 7/0081; H04N 5/225
USPC ................................................ 382/103, 104
See application file for complete search history.

(56) References Cited

U.S. PATENT DOCUMENTS

| | | | |
|---|---|---|---|
| 7,429,918 B2 * | 9/2008 | Watanabe | 340/468 |
| 2002/0011926 A1 | 1/2002 | King | |
| 2005/0169501 A1 * | 8/2005 | Fujii et al. | 382/104 |
| 2006/0274917 A1 * | 12/2006 | Ng et al. | 382/103 |
| 2010/0100284 A1 * | 4/2010 | Kudo et al. | 701/42 |
| 2010/0208071 A1 * | 8/2010 | Takahashi | 348/148 |
| 2012/0154579 A1 * | 6/2012 | Hampapur et al. | 348/143 |
| 2012/0200707 A1 * | 8/2012 | Stein et al. | 348/148 |
| 2012/0242835 A1 * | 9/2012 | Li et al. | 348/148 |

FOREIGN PATENT DOCUMENTS

| | | | |
|---|---|---|---|
| WO | 2004/081897 A2 | | 9/2004 |
| WO | WO 2011078300 | * | 6/2011 |

OTHER PUBLICATIONS

Nico Kaempchen, "Feature-Level Fusion of Laser Scanner and Video data for Advanced Driver Assistance Systems", Ulm university, Jun. 29, 2007.*
Balcones et al. "Real-Time Vision-Based Vehicle Detection for Rear-End Collision Mitigation Systems", Springer-Verlag Berlin Heidelberg 2009.*
Kaempchen, N., et al., "Fusion of Lasercanner and Video for Advanced Driver Assistance Systems," Proceedings of the 11th World Congress on Intelligent Transpostation Systems, pp. 1-8, Oct. 1, 2004.
Extended European Search Report dated Jun. 2, 2014.

* cited by examiner

*Primary Examiner* — Stephen R Koziol
*Assistant Examiner* — Shaghayegh Azima
(74) *Attorney, Agent, or Firm* — Harness, Dickey & Pierce, P.L.C.

(57) ABSTRACT

Disclosed are a method and a system for detecting a vehicle position by employing a polarization image. The method comprises a step of capturing a polarization image by using a polarization camera; a step of acquiring two road shoulders in the polarization image based on a difference between a road surface and each of the two road shoulders in the polarization image, and determining a part between the two road shoulders as the road surface; a step of detecting at least one vehicle bottom from the road surface based on a significant pixel value difference between each wheel and the road surface in the polarization image; and a step of generating a vehicle position from the vehicle bottom based on a pixel value difference between a vehicle outline corresponding to the vehicle bottom and background in the polarization image.

7 Claims, 6 Drawing Sheets

US 8,983,126 B2

METHOD AND SYSTEM FOR DETECTING VEHICLE POSITION BY EMPLOYING POLARIZATION IMAGE

BACKGROUND OF THE INVENTION

1. Field of the Invention

The present invention relates to a method and a system for detecting a vehicle position by employing a polarization image.

2. Description of the Related Art

In the fields of vehicle detection, hypothesis generation, polarization, image processing, etc., as a key step of vehicle detection, a hi efficient vehicle position generating approach may extremely increase the detection rate of a whole vehicle detecting system, and may reduce the misrecognition rate thereof.

In the following cited reference No. 1 titled as "A Device For Detection Of Surface Condition Data", a device for detecting properties or conditions of surfaces like water, snow, ice, etc., is disclosed. Two kinds of reflection are determined by using the following phenomenon: after polarized light is specularly reflected by ice or water on the surface of an object, the polarized nature may be kept, whereas after the polarized light is diffusely reflected by other kinds of surfaces, the polarized nature may be extremely weakened. The main thought of the cited reference No. 1 is emitting light, then detecting the reflection of the light, and then determining the surface condition of an object on the basis of the polarized nature of the reflected light.

In the following cited reference No. titled as "Polarametric Blind Spot Detector With Steerable Beam", a blind spot detection system is disclosed. The blind spot detection system includes a transmitter directing a circularly polarized signal into a blind spot adjacent to a vehicle; a receiver mounted on the vehicle, receiving a reflection of the circularly polarized signal which is oppositely circularly polarized; and an indicator indicating to the driver of the vehicle when the reflected signal is detected, thereby indicating the presence of an object in the blind spot. The main thought of the cited reference No. 2 is emitting polarized light toward a blind spot, then trying to detect the reflection of the polarized light, and then determining, if the reflection of the polarized light is detected, that an object in the blind spot is detected.

In the above described conventional techniques, it is mentioned that polarized light is utilized to detect an object. However, the two references only relate to a simple way of transmitting and receiving signals, and both of them need to actively emit polarized light, and to detect its reflection. In other words, these kinds of approaches cannot be directly applied to detection of an object in an image.

Furthermore, in the conventional vehicle detecting systems, visible light is mainly used for detection. However, compared to polarized light, the visible light is not robust with regard to various lighting conditions, weather, road surface conditions, etc.

Cited Reference No. 1: International Patent Application Publication No. WO 2004/081897 A2

Cited Reference No. 2: US Patent Application Publication No. 2002/0011926 A1

SUMMARY OF THE INVENTION

The present invention seeks to solve the above described problems in the prior art. In embodiments of the present invention, method and a system for detecting a vehicle position by employing a polarization image are provided.

According to one aspect of the present invention, there is provided a method of detecting a vehicle position by employing a polarization image. The method comprises a polarization image obtaining step of capturing a polarization image by using a polarization camera; a road surface detecting step of acquiring two road shoulders in the polarization image based on a difference between a road surface in the polarization image and each of the two road shoulders in the polarization image, and determining a part between the two road shoulders as the road surface; a vehicle bottom detecting step of detecting at least one vehicle bottom from the road surface based on a significant pixel value difference between each wheel in the polarization image and the road surface in the polarization image; and a vehicle position generating step of generating a vehicle position from the vehicle bottom based on a pixel value difference between a vehicle outline corresponding to the vehicle bottom in the polarization image and background in the polarization image.

Furthermore, in the method, the vehicle bottom detecting step comprises a step of extracting candidate wheel pixels by carrying out, based on a predetermined pixel threshold value, binarization with regard to the road surface in the polarization image; a step of performing a smoothing process with regard to the candidate wheel pixels so as to reduce noise; and a step of adopting scan windows, whose size gradually increase in proportion from top to bottom in the polarization image, to scan the whole road surface in the polarization image from top to bottom and left to right, and calculating elements of a co-occurrence matrix corresponding to each of the scan windows so as to determine at least one scan window, whose corresponding co-occurrence matrix has an element whose value is greater than a predetermined threshold value, as the vehicle bottom.

Moreover, in the method, the two road shoulders are acquired carrying out a step of obtaining edge pixels by utilizing Canny edge detection; and a step of acquiring two lines serving as the two road shoulders by using Hough transform based on the edge pixels.

In addition, in the method, the vehicle position generating step comprises a step of obtaining, based on a left side and a right side of the vehicle bottom as well as prior knowledge of a vehicle, a left side and a right side of the vehicle by extending the left side and the right side of the vehicle bottom upwards; and a step of acquiring, based on the different polarized nature between a top of the vehicle and the background, a weak edge serving as a vehicle top so as to form a rectangle of the vehicle outline by connecting the left and right sides of the vehicle, a bottom side of the vehicle bottom, and the vehicle top.

Also, in the method, the vehicle bottom is detected by calculating elements of co-occurrence matrixes, and by carrying out binarization based on a predetermined threshold value.

According to another aspect of the present invention, there is provided a system for detecting a vehicle position by employing a polarization image. The system comprises a polarization image capture unit configured to capture a polarization image by using a polarization camera; a road shoulder detecting unit configured to acquire two road shoulders in the polarization image based on a difference between a road surface in the polarization image and each of the two road shoulders in the polarization image; a road surface detecting unit configured to determine a part between the two road shoulders as the road surface; a vehicle bottom detecting unit configured to detect at least one vehicle bottom from the road surface based on a significant pixel value difference between each wheel in the polarization image and the road surface in the polarization image; and a vehicle position generating unit configured to generate a vehicle position from the vehicle bottom based on a pixel value difference between a vehicle outline corresponding to the vehicle bottom in the polarization image and background in the polarization image.

The method and the system for detecting a vehicle position by employing a polarization image are based on passive detection of the polarized light, using polarization techniques. Therefore, by applying the method and the system, it is possible to rapidly generate the vehicle position. Furthermore, since the polarized light is utilized for carrying out the detection, the method and the system are robust with regard to various lighting conditions, weather, road surface conditions, etc. Moreover, the method and the system may be applied to a vehicle-mounted camera so as to provide a function of preventing collision with another vehicle, and may also be applied to a road monitoring system or an intelligent transport system for detecting a vehicle.

DETAILED DESCRIPTION OF THE PREFERRED EMBODIMENTS

Hereinafter, embodiments of the present invention will be concretely described with reference to the drawings. However it should be noted that the same symbols, which are in the specification and the drawings, stand for constructional elements having basically the same function and structure, and repeated explanations for the constructional elements are omitted.

In what follows, a method of detecting a vehicle position by employing a polarization image, according o a first embodiment of the present invention is concretely illustrated by referring to FIGS. 1 to 8.

Figure 1:
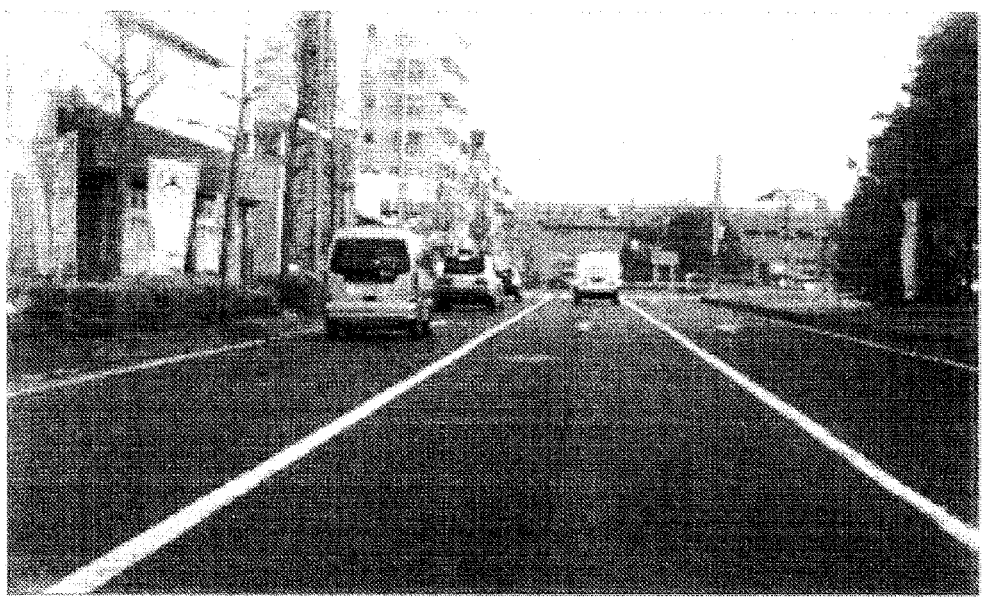
FIG. 1 illustrates an example of a grayscale image of a road including a few vehicles and background.

FIG. 1 illustrates an example of a grayscale image of a road including a few vehicles and background.

Figure 2:
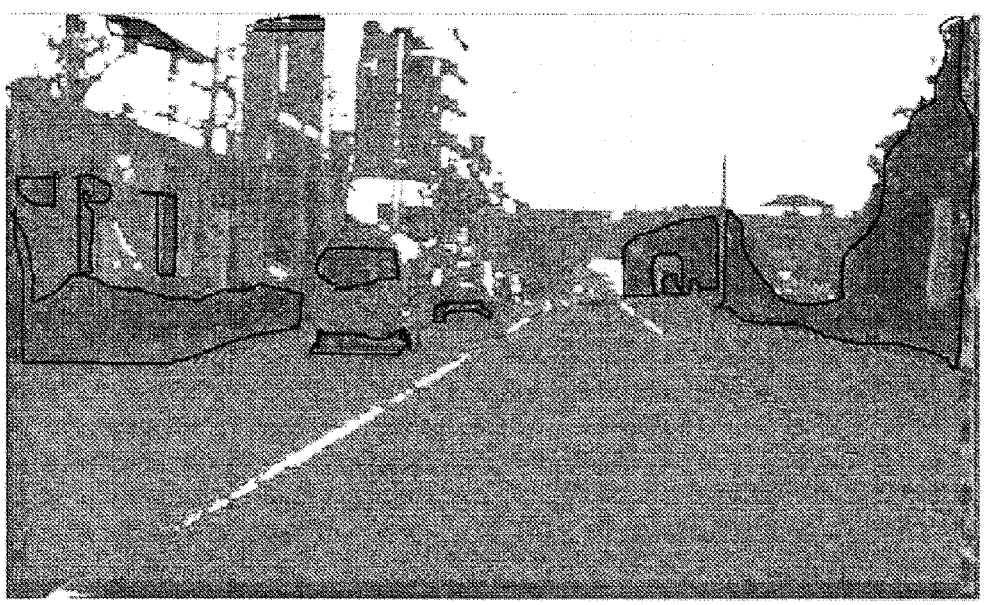
FIG. 2 illustrates a polarization image corresponding to the grayscale image shown in FIG. 1.

FIG. 2 illustrates a polarization image corresponding to the grayscale image shown in FIG. 1, wherein, parts surrounded by heavy lines are those having different polarized properties. Here it should be noted that different polarized light may also be represented by different color.

By taking the polarization image shown in FIG. 2 as an example, a few basic steps of the vehicle position detecting method are described as follows.

The basic steps comprise a step of detecting road shoulders on the basis of edges of the polarization image; a step of obtaining a range of a road surface on the basis of the road shoulder information; a step of detecting a bottom region of a vehicle in the range of the road surface; and a step of generating a vehicle position.

In the step of detecting the road shoulders on the basis of the edges of the polarization image, the pixels of the edges are obtained by performing Canny edge detection with regard to the polarization image; then lines are detected by employing Hough Transform; and then the length, direction, and degree of confidence of the detected lines are analyzed so as to get the final positions of the road shoulders.

Since the directions of the road shoulders and the road surface are different, their boundaries in the polarization image are obvious. As a result, the road shoulders and the road surface are easily detected.

In general, the Canny edge detection includes a process of removing noise by carrying out, for example, Gaussian smoothing with regard to the polarization image; a process of seeking brightness gradients for marking edges (here the edges refer to those where the brightness gradients have relatively great width); a process of performing non-maximum suppression so as to ensure that only a local maximum value is able to be marked as one of the edges; a process of conducting double threshold binarization so as to determine weak edges on the basis of two threshold values; and a process of tracking the edges so as to determine, by suppressing any one of the edges not connected to strong edges, the final edges.

Particularly, in the first embodiment, the Canny edge detection includes the following processes.

1. Removing Noise

In general, any edge detecting approach may not carry out good detection with regard to an original image that has not been processed. As a result, convolution is first performed with regard to the polarization image and a Gaussian mask. The image obtained in this way is slightly blurry, compared to the polarization image. Thus noise of a single pixel may not generate any influence in the image obtained by performing the Gaussian smoothing.

2. Seeking Brightness Gradients

In general, edges in an image may have different directions. As a result, the Canny edge detection uses four masks to detect edges in the horizontal, vertical, and diagonal directions of the polarization image. The result obtained by carrying out convolution with regard to the polarization image and each of the four masks is stored. As for each pixel point in the polarization image, a maximum brightness value of the corresponding pixel point and a direction of an edge generated by (including) the corresponding pixel point are calculated. Thus, on the basis of the polarization image, the brightness gradients and their directions of the respective pixels points thereof are generated.

3. Tracking Edges

In general, pixel points having relatively great brightness gradients may form edges. However, there is not a sure brightness gradient value by which pixel points may be determined as those able to make up edges. As a result, the Canny edge detection utilizes hysteresis thresholding.

The hysteresis thresholding needs two threshold values, namely a big threshold value and a small threshold value. Here it is supposed that an important edge in the polarization image is a continuous curve. Thus the blurry part of a given curve may be tracked so as to avoid causing pixel points serving as noise, not forming the curve to belong to an edge. As a result, by using the big threshold value, a relatively sure (real) edge may be obtained; then by applying the above acquired direction information, a whole edge in the polarization image may be tracked by starting from the relatively real edge. When carrying out the tracking, the small threshold value is utilized so that it is possible to track the blurry part of the curve until returning to the start point. Once this process is finished, a binary image, in which each pixel point indicates whether it is an edge point, is obtained.

4. Performing Differential Edge Detection

Here a more refined second-order edge detection approach which automatically detects edges with sub-pixel accuracy is utilized. The second-order edge detection approach uses a differential approach of detecting zero-crossings of the second-order directional derivative in the gradient direction (for example, as shown in http://en.wikipedia.org/wiki/Edge_detection#Differential_edge_detection). In this way, the edges may be automatically obtained as continuous curves with sub-pixel accuracy. The hysteresis thresholding may also be applied to sub-pixel edge segments.

Furthermore, the Canny edge detection includes some adjustable parameters that may influence the calculation time and the actual effects of the Canny edge detection. The adjustable parameters may be the size of a Gaussian filter, a threshold value, etc. In a case of the size of a Gaussian filter, any Gaussian smoothing filters may directly affect the result of the Canny edge detection. A blurry effect generated by a relatively small Gaussian filter is relatively small too, thereby being able to detect a relatively small and obviously changed thin line. A burry effect generated by a relatively big Gaussian filter is relatively big too, thereby being able to fill a relatively big image block with a color value of a specific pixel point. As a result, a relatively big Gaussian filter is more helpful for detecting a relatively big and smooth edge such as an edge of a rainbow. In a case of the threshold value, using two threshold values is more flexible than using one threshold value. However, there still is a common problem existing in a threshold value; that is, if a threshold value is set too high, then some important information may be filtered, and if the threshold value is set too low, then some detailed information may be regarded very important. In other words, it is difficult to give a common threshold value that is able to be applied to all images. At least for now, there is not a verified approach of giving this kind of common threshold value.

The Canny edge detection adapts to various situations. Its parameters may be adjusted according to various specific needs in order to recognize different edge properties. As for a real time image process on a personal computer (PC), the Canny edge detection may be too slow to use, particularly in a case where a large-sized Gaussian filter is adopted. However, when mentioning the computational capability of the Canny edge detection, it should be considered that the processing speed of a processor is gradually being improved; in other words, perhaps in the near future, this kind of problem will be gone.

The Hough transform (for example, as shown in http://en.wikipedia.org/wiki/Hough_transform) is a feature extraction technique used in image analysis, computer vision, and digital image processing. The purpose of the technique is to find imperfect instances of objects within a certain class of shapes by a voting procedure. The simplest case of the Hough transform is a linear transform for detecting straight lines. In an image space, the straight line can be described as y=mx+b and can be graphically plotted for each pair of image points (x, y). In the Hough transform, a main idea is to consider the characteristics of the straight line not as image points (x1, y1), (x2, y2), etc., but in terms of its parameters, i.e., the slope parameter m and the intercept parameter b. Based on that fact, the straight line y=mx+b can be represented as a point (b, m) in a parameter space. As a result, by employing the Hough Transform, the road shoulders in the polarization image may be detected.

Figure 3:
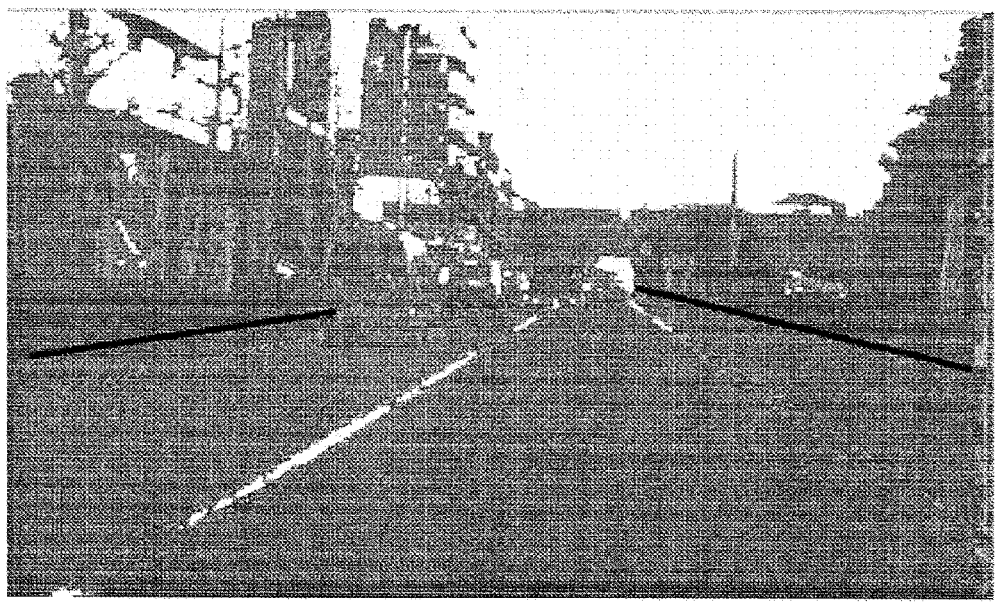
FIG. 3 illustrates a result of detecting road shoulders in the polarization image shown in FIG. 2.

FIG. 3 illustrates a result of detecting road shoulders in the polarization image shown in FIG. 2, wherein, two heavy lines refer to the detected road shoulders.

Next, in the step of obtaining the range of the road surface on the basis of the road shoulder information, not only the road shoulder information but also prior knowledge (for example, in an usual case, a region between road shoulders on both sides of a road should be a road surface) is used. For example, in a simple case, an intersection point may be acquired by extending the two road shoulders shown in FIG. 3, and pixels between the two extended road shoulders may be regarded as road surface pixels.

Figure 4:
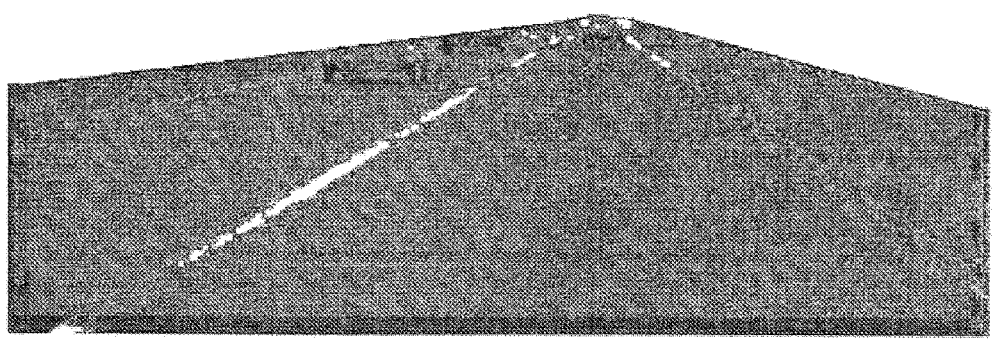
FIG. 4 illustrates a road surface detected from the FIG. 2.

FIG. 4 illustrates the road surface detected from FIG. 2.

Next, in the step of detecting the bottom region of the vehicle in the range of the road surface, the bottom region of the vehicle is detected by searching for a significant pattern of a wheel in the polarization image. Here a vehicle bottom detecting approach based on a co-occurrence matrix is proposed. Since the wheel and the road surface have totally different patterns in the polarization image, in particular, since two wheels are represented as two parallel straight lines whose pixel values are very different from those of the road surface, by applying the vehicle bottom detecting approach, it is possible to carry out effective detection.

The vehicle bottom detecting approach based on the co-occurrence matrix includes the following processes.

1. Extracting Wheel Pixels

Wheel pixels may be extracted by carrying out binarization in which a threshold value may be chosen on the basis of a rule of thumb, or may be obtained from experiment. Since the polarization value of the vehicle bottom is very different from that of the road surface, it is relatively easy to determine the threshold value. For example, it is possible to analyze distribution ranges of pixel values of the vehicle bottom and pixel values of the road surface, respectively, then to seek the respective geometric centers of the two distribution ranges, and then to let the average value of the two geometric centers be the threshold value. Moreover, it is also possible to utilize a histogram of the road surface region, then to seek a valley value between two peak values, and then to let the sought valley value be the threshold value.

2. Performing Smoothing Process

In order to reduce influence of noise, a smoothing process is carried out. The smoothing process may adopt average filtering or Gaussian filtering. In particular, scan windows are used to scan the whole road surface region from top to bottom, left to right. Here the scan windows refer to a series of rectangle windows whose size and aspect ratios coincide with a reasonable size range of a vehicle. This kind of size range belongs to prior knowledge, and may be obtained by observation. After that, elements of the co-occurrence matrix may be calculated by employing the following equation (1).

$$C_{\Delta x,0}(1,1) = \sum_{p=1}^{n}\sum_{q=1}^{m}\begin{cases} 1, & \text{if } B(p,q)=1 \text{ and } B(p+\Delta x, q)=1 \\ 0, & \text{otherwise} \end{cases} \quad (1)$$

Here $C_{\Delta x,0}(1,1)$ refers to an element of the co-occurrence matrix, i.e., the number of pixel pairs (as for each of the pixel pairs, the pixel values of the two pixels in the corresponding pixel pair are 1, and the horizontal distance between the two pixels is $\Delta x$); and m and n refer to the height and the width of the corresponding scan window, respectively. Here it should be noted that for example, the co-occurrence matrix may be reached by accessing http://en.wikipedia.org/wiki/Co-occurrence_matrix.

If $\max\{C_{\Delta x,0}(1,1)|\Delta x=1,\ldots,n\}$ is greater than a threshold value predetermined, for example, on the basis of a rule of thumb, then it is determined that two parallel straight lines are detected. In other words, a pair of wheels is obtained. In this way, a possible vehicle bottom, i.e., the current scan window may obtained.

3. Generating Vehicle Bottom Region

Later, as for all of the possible vehicle bottom regions obtained by carrying out the above described process, a grouping process is conducted with regard to them so as to generate the vehicle bottom region by grouping the similar possible vehicle bottom regions.

Here it should be noted that all the operations are carried out in the range of the road surface; and considering a rule of "big when far, small when close", the size of the scan windows may gradually increase in proportion from top to bottom so as to increase the scan speed.

Figure 5:
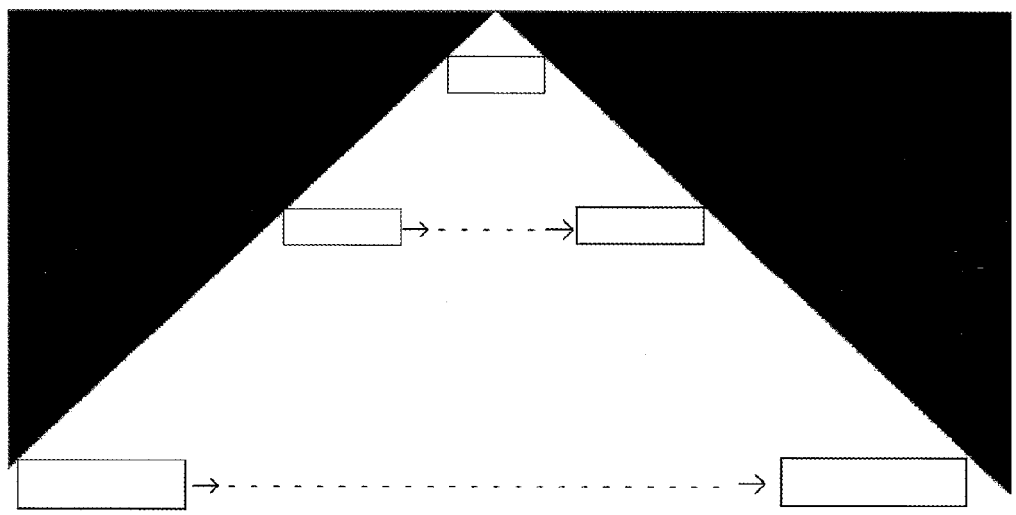
FIG. 5 illustrates an example of sliding scan windows.

FIG. 5 illustrates an example of sliding scan windows. In FIG. 5, the white region refers to the road surface; the rectangles refer to the scan windows; and the arrows refer to sliding directions.

Figure 6:
FIG. 6 illustrates bottom regions of vehicles detected from FIG. 2.

FIG. 6 illustrates the vehicle bottom regions obtained from FIG. 2.

Next, in the step of generating the vehicle position, edges and prior knowledge are used to achieve the aim. For example, on the basis of a rule of thumb, as for an obtained bottom region of a vehicle, upward extension of its left and right sides should be two sides of the vehicle. Furthermore, the polarized nature of the left and right sides of the vehicle is different from that of the background (for example, the road surface or buildings); as a result, in the polarization image, there are edges among them. Although these kinds of edges (called "weak edges") are not as obvious as an edge (called a "strong edge") between a wheel and the road surface, by tracking these kinds of weak edges so as to extend the left and right sides of the vehicle bottom region, it is possible to obtain the two sides of the vehicle. Moreover, she polarized nature of the top of the vehicle is different from that of the background; as a result, it is also possible to obtain another weak edge by using the similar approach. Thus it is possible to get a rectangle of the vehicle outline by connecting the three weak edges and the bottom side of the vehicle bottom region.

In addition, aspect ratios of most vehicles are given. By using this prior knowledge, it is possible to reduce the influence applied to vehicle outline detection, caused by other weak edges generated by noise. That is, after the vehicle bottom region is detected, the width of the vehicle should be determined to In other words, as long as the vehicle top edge is found, the vehicle outline is obtained.

Different vehicles have different aspect ratios, but there still is a possible range. On the basis of this possible range and the detected vehicle bottom region, it is possible to obtain a possible range of the vehicle top edge. If it is supposed that the range of the aspect ratio of the vehicle is [r1,r2], and the width and the ordinate of the bottom side of the detected vehicle bottom region are w and y, then the range of the vehicle top edge is [r1*w+y,r2*w+y], and the abscissa of the vehicle top edge is the same with that of the vehicle bottom region.

After that, in this relatively small range of the vehicle top edge, the vehicle top edge is detected. In particular, the Sobel operator $G_y$ (as shown in the following equation (2)) is used for carrying out filtering with regard to the relatively small range of the vehicle top edge. Then a relatively small threshold value is used to perform binarization so as to get a relatively horizontal edge. After that, the relatively horizontal edge is projected onto the y-axis so as to obtain a y-axis value corresponding to a position where the projected points are densest. Finally the obtained y-axis value is determined as the ordinate of the vehicle top edge. As a result, the vehicle top edge, the bottom side of the vehicle bottom region, and two straight lines obtained by extending the left and right sides of the vehicle bottom region may make up a rectangle. This rectangle is finally determined as a region of the vehicle.

$$G_y = \begin{bmatrix} -1 & -2 & -1 \\ 0 & 0 & 0 \\ 1 & 2 & 1 \end{bmatrix} \quad (2)$$

Based on the region of the vehicle, it is possible to determine the vehicle position.

Figure 7:
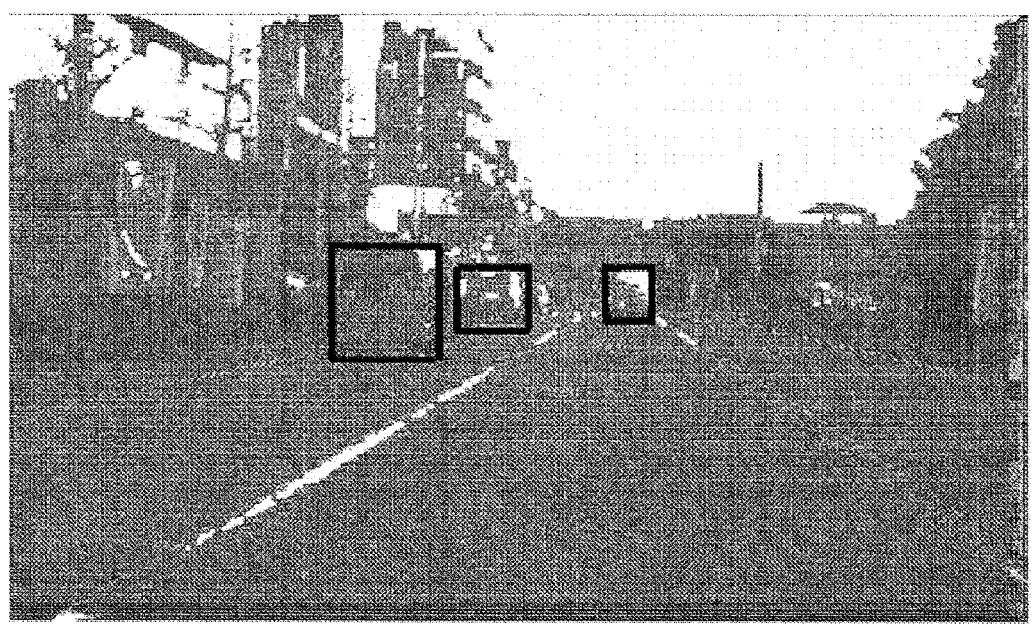
FIG. 7 illustrates vehicle positions detected from FIG. 2.

FIG. 7 illustrates vehicle positions determined from FIG. 2.

Figure 8:
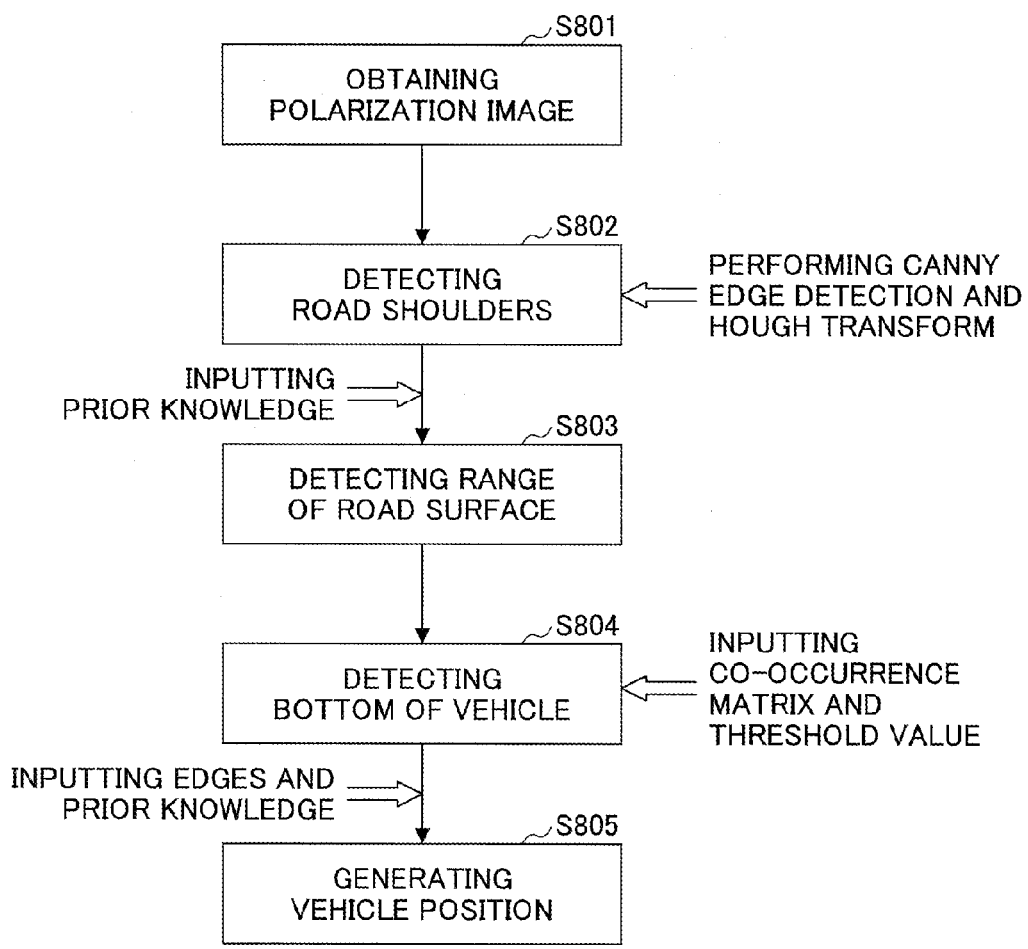
FIG. 8 is a flowchart of detecting a vehicle position.

FIG. 8 is a flowchart of the method of detecting the vehicle position according to the first embodiment.

Here it should be noted that as for a whole vehicle detecting system, after the vehicle position is generated, a verification step is necessary to verify whether a vehicle is located at the generated vehicle position. However, this kind of verifying step is not included in the flowchart shown in FIG. 8.

In STEP S801, a polarization image is captured by, for example, a polarization imaging sensor such as a polarization camera.

In STEP S802, the Canny edge detection and the Hough transform is carried out by, for example, a road shoulder detecting unit.

In STEP S803, the road surface in the polarization image is obtained on the basis of the detected road shoulders and the prior knowledge by, for example, a road surface detecting unit.

In STEP S804, the vehicle bottom is acquired according to the threshold value determined based on a rule of thumb and the co-occurrence matrix by, for example, a vehicle bottom detecting unit.

Finally, in STEP S805, the vehicle position is generated on the basis of the above described process by, for example, a vehicle position generating unit.

Figure 9:
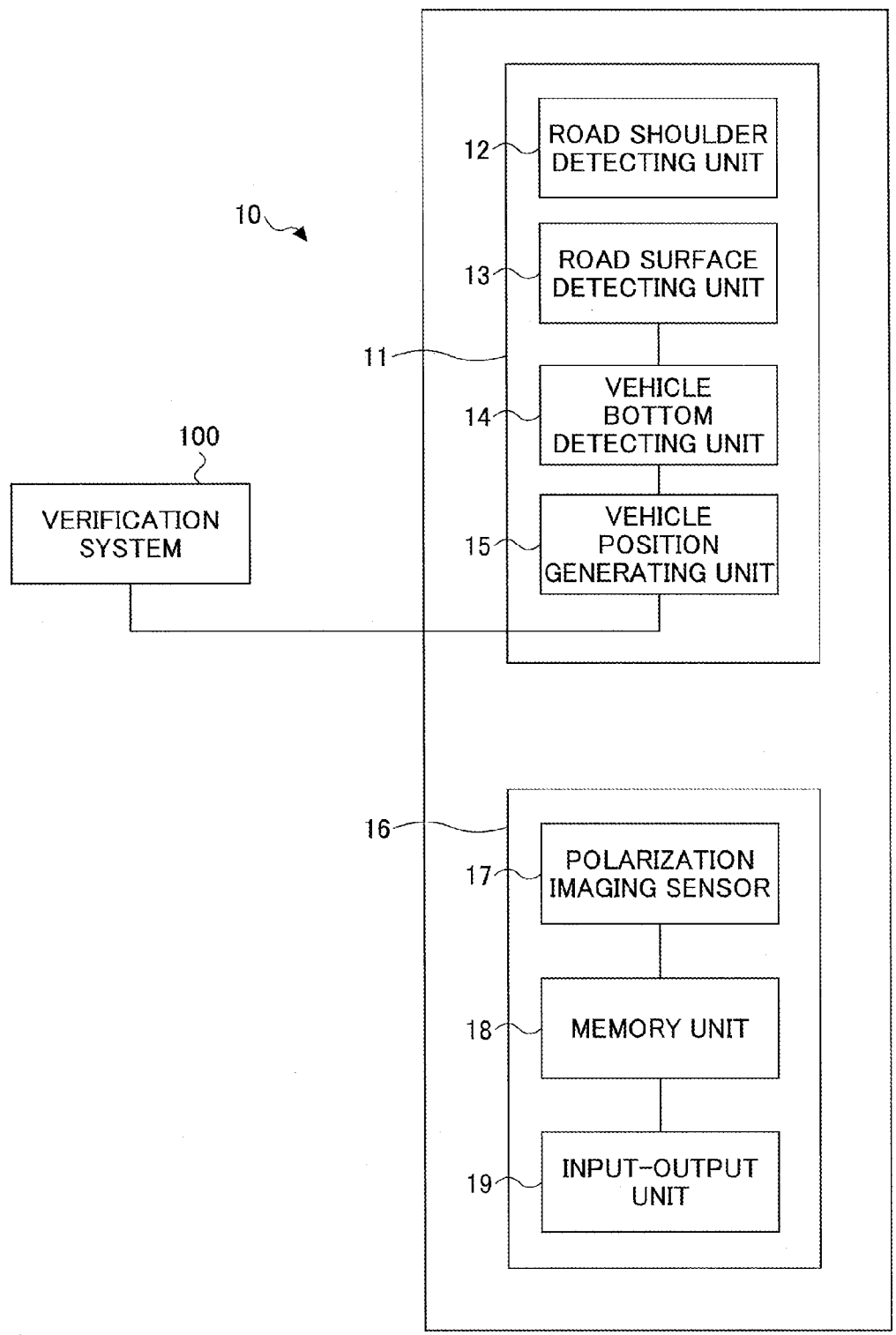
FIG. 9 illustrates a system for detecting a vehicle position.

In what follows, a system for detecting a vehicle position by employing a polarization image, according to a second embodiment of the present invention is concretely illustrated by referring to FIG. 9.

FIG. 9 illustrates a vehicle detecting system 10 for detecting a vehicle position according to the second embodiment.

As shown in FIG. 9, the vehicle detecting system 10 includes a first sub system 11 and a second sub system 16. The first sub system 11 includes a road shoulder detecting unit 12, a road surface detecting unit 13, a vehicle bottom detecting unit 14, and a vehicle position generating unit 15. The first sub system 11 utilizes the method according the first embodiment to achieve the vehicle position generation, and outputs the corresponding result. The output result, i.e., the generated vehicle position may be input into a verification system 100 shown in FIG. 9 for verifying whether there is a vehicle at the generated vehicle position, or may be for other use. The second sub system 16 includes a polarization imaging sensor 17, a memory unit 18, and an input-output unit 19. The second sub system 16 provides related data and other support.

In addition, it should be noted that the method described in the first embodiment may be carried out by a computer (a processor), or may be carried out by plural computers in a parallel way. Furthermore, a program by which the method is achieved may be stored in a non-transitory computer-readable (or machine-readable) medium, or may be transmitted to one or more remote computers for executing the program via a network.

While the method and the system for detecting a vehicle position by employing a polarization image are described with reference to the specific embodiments chosen for purpose of illustration, it should be apparent that the present invention is not limited to these embodiments, but numerous modifications could be made thereto by those people skilled in the art without departing from the basic concept and technical scope of the present invention.

The present application is based on Chinese Priority Patent Application No. 201110263794.7 filed on Sep. 7, 2011, the entire contents of which are hereby incorporated by reference.

What is claimed is:

1. A method of detecting a vehicle position by employing a polarization image, comprising:
    a polarization image obtaining step of capturing a polarization image by using a polarization camera;
    a road surface detecting step of acquiring two road shoulders in the polarization image based on a difference between a road surface in the polarization image and each of the two road shoulders in the polarization image, and determining a part between the two road shoulders as the road surface;
    a vehicle bottom detecting step of detecting at least one vehicle bottom from the road surface based on a pixel value difference between each wheel in the polarization image and the road surface in the polarization image; and
    a vehicle position generating step of generating a vehicle position from the vehicle bottom based on a pixel value difference between a vehicle outline corresponding to the vehicle bottom in the polarization image and background in the polarization image,
    wherein, the vehicle bottom detecting step includes,
        a step of extracting candidate wheel pixels by carrying out, based on a predetermined pixel threshold value, binarization with regard to the road surface in the polarization image; and
        a step of adopting scan windows, whose size gradually increase in proportion from top to bottom in the polarization image, to scan the whole road surface in the polarization image at least from top to bottom, and calculating elements of a co-occurrence matrix corresponding to each of the scan windows so as to determine at least one scan window, whose corresponding co-occurrence matrix has an element whose value is greater than a predetermined threshold value, as the vehicle bottom.

2. The method according to claim 1, wherein, the vehicle bottom detecting step further comprises:
    a step of performing a smoothing process with regard to the candidate wheel pixels so as to reduce noise.

3. The method according to claim 1, wherein, the acquiring two road shoulders in the polarization image comprises:
    a step of obtaining edge pixels by utilizing Canny edge detection; and
    a step of acquiring two lines serving as the two road shoulders by using Hough transform based on the edge pixels.

4. The method according to claim 3, wherein, the vehicle position generating step comprises:
    a step of obtaining, based on a left side and a right side of the vehicle bottom as well as prior knowledge of a vehicle, a left side and a right side of the vehicle by extending the left side and the right side of the vehicle bottom upwards; and
    a step of acquiring, based on a difference between a polarized nature of a top of the vehicle and a polarized nature of the background, a weak edge serving as a vehicle top so as to form a rectangle of the vehicle outline by connecting the left and right sides of the vehicle, a bottom side of the vehicle bottom, and the vehicle top.

5. The method according to claim 3, wherein,
the detecting at least one vehicle bottom comprises:
    calculating elements of co-occurrence matrixes, and carrying out binarization based on a predetermined threshold value.

6. A system comprising:
a memory unit;
and a processor,
the memory unit storing instructions that, when executed by the processor, cause the processor to perform operations for detecting a vehicle position by employing a polarization image, the operations including, a polarization image obtaining step of capturing a polarization image by using a polarization camera;
    a road surface detecting step of acquiring two road shoulders in the polarization image based on a difference between a road surface in the polarization image and each of the two road shoulders in the polarization image, and determining a part between the two road shoulders as the road surface;
    a vehicle bottom detecting step of detecting at least one vehicle bottom from the road surface based on a pixel value difference between each wheel in the polarization image and the road surface in the polarization image;
    and a vehicle position generating step of generating a vehicle position from the vehicle bottom based on a pixel value difference between a vehicle outline corresponding to the vehicle bottom in the polarization image and background in the polarization image,
    wherein, the vehicle bottom detecting step includes,
    a step of extracting candidate wheel pixels by carrying out, based on a predetermined pixel threshold value, binarization with regard to the road surface in the polarization image; and
    a step of adopting scan windows, whose, size gradually increase in proportion from top to bottom in the polarization image, to scan the whole road surface in the polarization image at least from top to bottom, and calculating elements of a co-occurrence matrix corresponding to each of the scan windows so as to determine at least one scan window, whose corresponding co-occurrence matrix has an element whose value is greater than a predetermined threshold value as the vehicle bottom.

7. A method of detecting a vehicle position by employing a polarization image, comprising:
    a polarization image obtaining step of capturing a polarization image by using a polarization camera;
    a road surface detecting step of acquiring two road shoulders in the polarization image based on a difference between a road surface in the polarization image and each of the two road shoulders in the polarization image, and determining a part between the two road shoulders as the road surface;
    a vehicle bottom detecting step of detecting at least one vehicle bottom from the road surface based on a significant pixel value difference between each wheel in the polarization image and the road surface in the polarization image; and
    a vehicle position generating step of generating a vehicle position from the vehicle bottom based on a pixel value difference between a vehicle outline corresponding to the vehicle bottom in the polarization image and background in the polarization image, wherein, the acquiring two road shoulders in the polarization image includes,
   a step of obtaining edge pixels by utilizing Canny edge detection; and
   a step of acquiring two lines serving as the two road shoulders by using Hough transform based on the edge pixels, and
wherein the detecting at least one vehicle bottom includes,
   calculating elements of co-occurrence matrixes, and
   carrying out binarization based on a predetermined threshold value.

\* \* \* \* \*